H. B. PALMER.
EDUCATIONAL TOY.
APPLICATION FILED MAR. 19, 1909.
948,633.
Patented Feb. 8, 1910.
2 SHEETS—SHEET 1.
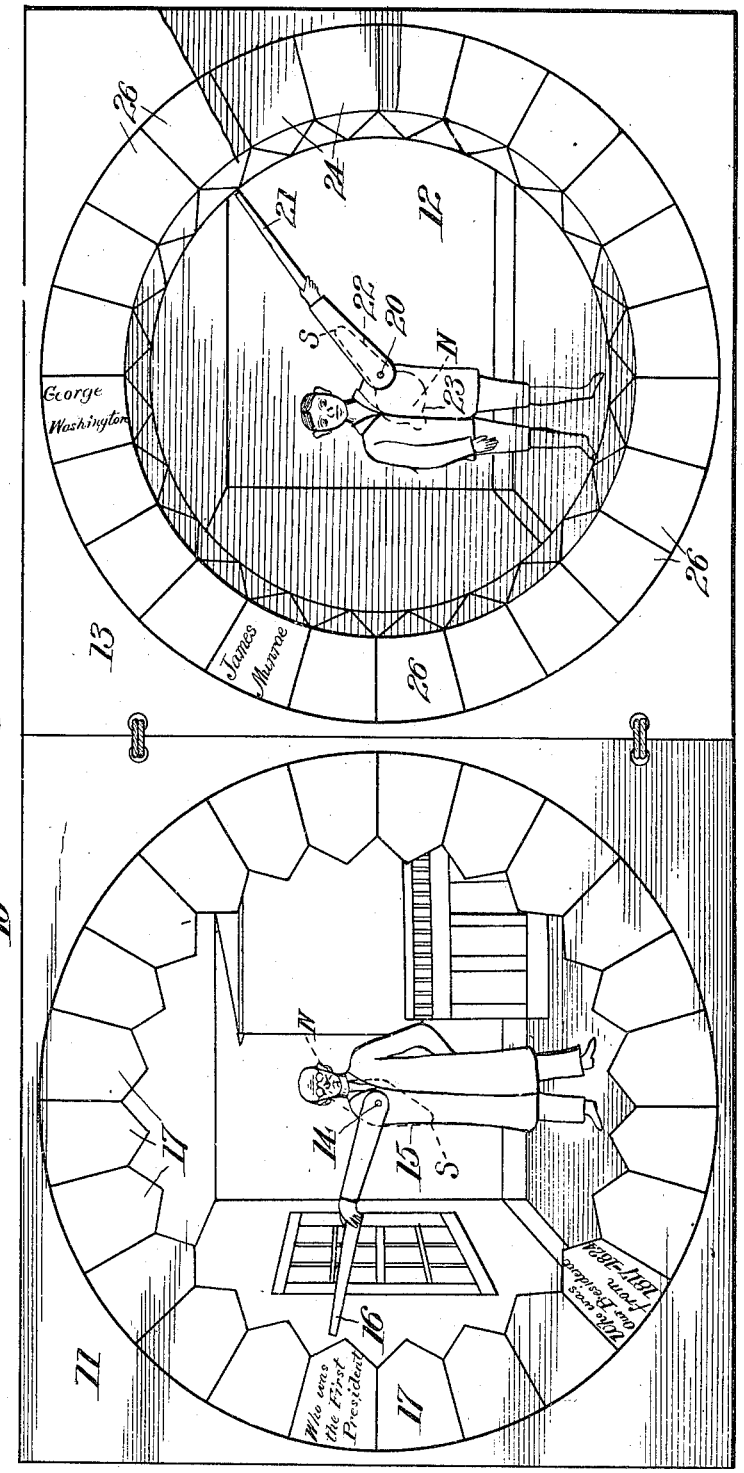
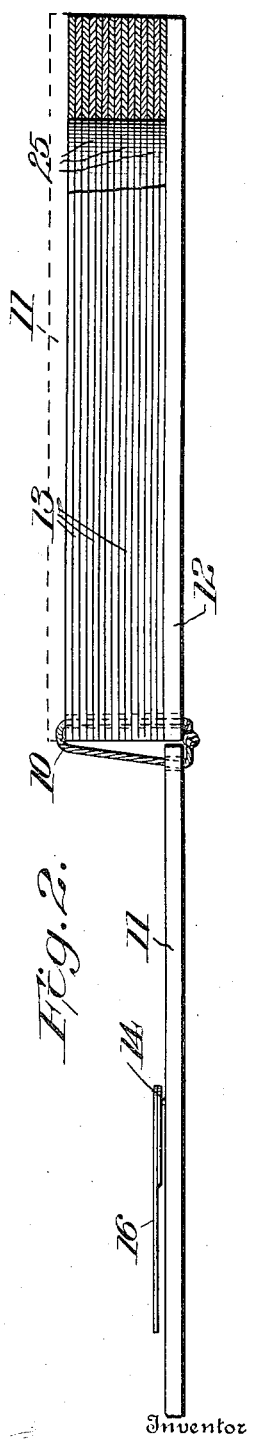
Witnesses
C. H. Walker
M. E. Smith
Inventor
Harry B. Palmer
By Wm. B. Hodges
Attorney

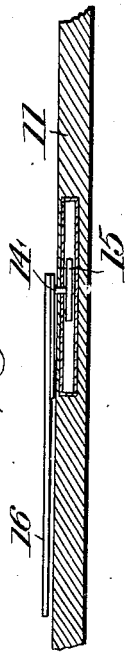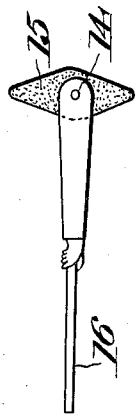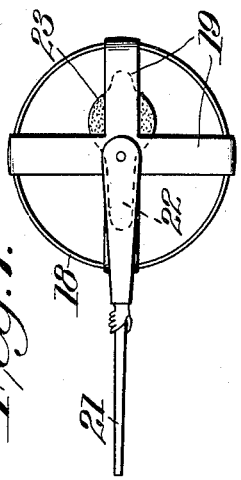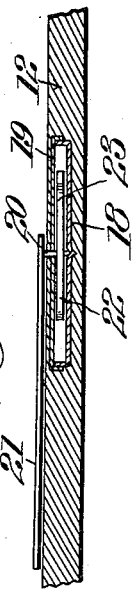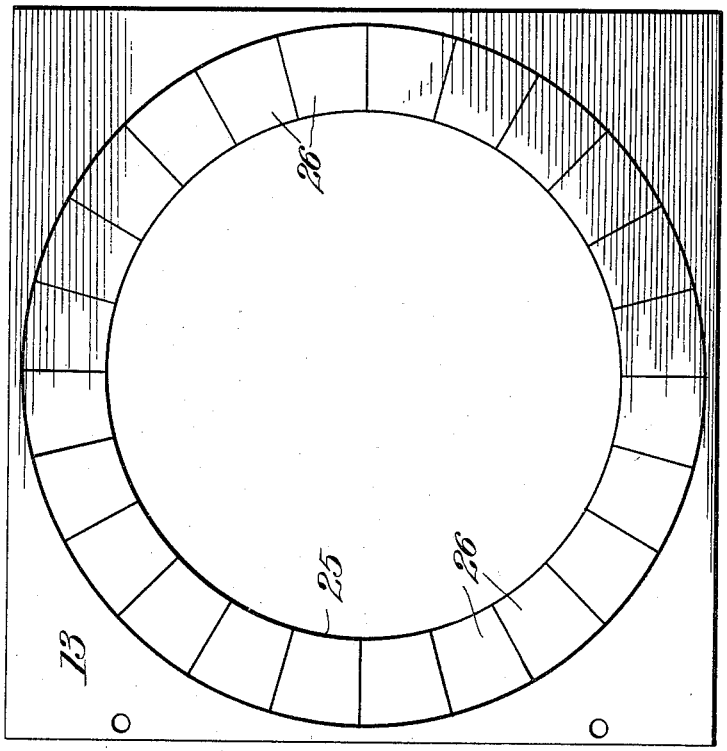

UNITED STATES PATENT OFFICE.

HARRY B. PALMER, OF NEW YORK, N. Y., ASSIGNOR OF ONE-HALF TO JEFFERY-DEWITT COMPANY, OF NEWARK, NEW JERSEY, A CORPORATION OF NEW JERSEY.

EDUCATIONAL TOY.

948,633.  Specification of Letters Patent.  Patented Feb. 8, 1910.

Application filed March 19, 1909. Serial No. 484,519.

*To all whom it may concern:*

Be it known that I, HARRY B. PALMER, of New York, in the county of Kings, State of New York, have invented certain new and useful Improvements in Educational Toys, of which the following is a specification.

This invention relates to certain new and useful improvements in educational toys.

The object of the invention is to produce a simple device by means of which any one of a plurality of questions arranged to be indicated by a pointer, may be answered by a second pointer arranged to operate in conjunction with a plurality of answers which are arranged in predetermined relation with respect to the questions.

A further object of the invention is to provide a toy of this character constructed to add an element of mystery in connection with the answering of the respective questions that might be propounded.

A further object is to provide improved means for supporting the pointers.

The invention will be hereinafter fully set forth and particularly pointed out in the claims.

In the accompanying drawings:—Figure 1 is a plan view of my improved toy, the same being illustrated as a book opened for inspection. Fig. 2 is an edge view thereof, parts being broken away and shown in section. Fig. 3 is a plan view of one of the leaves. Fig. 4 is a transverse sectional view thereof. Fig. 5 is a detail sectional view illustrating the interrogation pointer and its adjuncts. Fig. 6 is a top plan view of said pointer removed from its bearings. Fig. 7 is a top plan view of the response pointer and its mounting. Fig. 8 is a detail sectional view illustrating the manner of concealing the operating parts of the response pointer.

Referring to the drawing, 10 designates a book, formed of covers 11, 12, and intermediate leaves 13, bound together in any suitable or preferred manner. In the center of the cover 11 is mounted a small shaft 14 free to swing or rotate in its bearings and having secured thereto a small permanent magnet 15 and a pointer 16, said magnet and pointer being arranged to move with said shaft. The cover 11 is also provided with a circular series of subdivisions 17 each provided with a question to be indicated by the pointer 16, said questions to be of any suitable character, although I prefer to employ a series of questions on educational subjects.

The cover 12 is provided with a suitable recess in which is mounted a box or casing 18 of any suitable non-magnetic material, provided with cross bars 19 which serve as a bearing for a shaft 20 which is free to rotate. To the upper end of said shaft is secured a pointer 21, and a permanent magnet 22 is also secured to said shaft below said cross bars in such manner as to be located within the box or casing 18. Said magnet is provided with a counterweighted portion 23. The cover 12 is also provided with a circular series of subdivisions 24, similar to the subdivisions 17, and arranged to contain answers to the questions heretofore referred to, said answers being arranged in predetermined relation with respect to the questions and in such manner as to be indicated by the pointer 21.

The leaves 13 are each cut out centrally as indicated at 25 to expose the pointers, and each leaf is provided with a circular series of subdivisions 25 on each side, similar to the subdivisions 17 and 24; the subdivisions on one side being intended for questions, those on the opposite side being intended for answers. It is obvious that as many leaves may be used as desired. It will also be noted that the peripheral distance of the subdivisions 26 must be definitely proportioned to the peripheral distance of the subdivisions 17.

In practice, the toy is operated as follows: The pointer 16 is moved by hand to indicate any desired question, such as, for instance, "Who was our president from 1817 to 1824?" The book is then closed and placed in a horizontal position, whereupon the magnet 22 will change its position to correspond with the position of the magnet 15, i. e. the magnet 22 will move into a position parallel with the magnet 15, bringing the pointer 21 opposite the desired answer, which in the instance mentioned would be "James Monroe." In this movement the counter weight 23 serves to counterbalance the weight of the pointer 21, whereby the latter will remain in the position to which moved.

From the foregoing it will be perceived that I have produced an exceedingly instructive and amusing toy which is very simple in construction, the scope of the instruction being limited solely by the number of pages it may be found possible to bind between two covers. The element of mystery which is added by reason of the necessity of closing the book before the response pointer will indicate the desired answer also greatly enhances the value of the toy as a means of amusement.

I claim as my invention:—

1. A toy of the character described comprising a plurality of relatively movable members bound together and provided with correlated text, a pointer carried by each member, and means for automatically changing the position of one pointer to conform to the position of the other pointer, when said members are brought together.

2. A toy of the character described comprising a plurality of pointers, independent separable supports for said pointers provided with correlated text, and means for automatically changing the position of one pointer to conform to the position of the other pointer, when said supports are brought adjacent each other.

3. A toy of the character described comprising a manually movable interrogation pointer, a response pointer, independent separable supports for said pointers provided with correlated text, and means for automatically changing the position of the response pointer to conform to the position of the interrogation pointer, when said pointers are brought adjacent each other.

4. A toy of the character described comprising a plurality of relatively movable members bound together and provided with correlated text, a manually movable interrogation pointer carried by one member, a response pointer carried by the other member, and means for automatically changing the position of the response pointer to conform to the position of the interrogation pointer when said members are brought together.

5. A toy of the character described comprising a plurality of pointers, separable means for holding said pointers and provided with correlated text and a magnet connected to each pointer, whereby the position of one pointer is changed to conform to the position of the other pointer when the magnets are brought adjacent each other.

6. A toy of the character described comprising a plurality of pointers, independent separable supporting means for each pointer provided with correlated text, and a magnet connected to each pointer, one of said magnets being counterweighted.

7. A toy of the character described comprising a plurality of pointers, a support for each pointer, said supports being provided with correlated text and adapted to be normally separated, and a magnet connected to each pointer, whereby the position of one pointer is changed to conform to the position of the other pointer when the supports are brought together.

8. A toy of the character described comprising a plurality of supports provided with correlated text and adapted to be normally separated, a movable pointer mounted in one of said supports and provided with a magnet, a non-magnetic casing mounted in the other support, a second magnet mounted in said casing, and a pointer connected to said magnet.

9. A toy of the character described comprising a plurality of supports provided with correlated text and adapted to be normally separated, a movable pointer mounted in one of said supports, a magnet connected thereto, a non-magnetic casing mounted in the other support, a counterbalanced magnet mounted in said casing, and a pointer connected to the last mentioned magnet.

10. A toy of the character described comprising a plurality of relatively movable members bound together and provided with correlated text, a movable pointer mounted in one of said members, a magnet connected thereto, a non-magnetic casing mounted in the other member, a magnet mounted in said casing, and a pointer connected to the last mentioned magnet.

11. A toy of the character described comprising a plurality of relatively movable members bound together and provided with correlated text, a movable pointer mounted in one of said members, a magnet connected thereto, a non-magnetic casing mounted in the other member, a counterbalanced magnet mounted in said casing, and a pointer connected to said counterbalanced magnet.

12. A toy of the character described comprising a plurality of covers and leaves bound together in book form, said covers and leaves being provided with interrogation spaces and response spaces, a pointer carried by each cover, and means for automatically changing the position of one pointer to conform to the position of the other pointer, when said covers are closed.

13. A toy of the character described comprising a plurality of covers and leaves bound together in book form, said covers and leaves being provided with interrogation spaces and response spaces, a pointer carried by each cover, the pages being cut out centrally to accommodate said pointers, and means for automatically changing the position of one pointer to conform to the position of the other pointer, when the covers are closed.

14. A toy of the character described comprising a plurality of covers and leaves bound together in book form, said covers and leaves being provided with interrogation spaces and response spaces, a pointer carried by each cover, and a magnet connected to each pointer.

15. A toy of the character described comprising a plurality of covers and leaves bound together in book form, said covers and leaves being provided with interrogation spaces and response spaces, a pointer carried by each cover, and a magnet connected to each pointer, said pages being cut out centrally to accommodate said pointers.

16. A toy of the character described comprising a plurality of covers and leaves bound together in book form, said covers and leaves being provided with interrogation spaces and response spaces, a pointer carried by each cover, and a magnet connected to each pointer, one of said magnets being counterweighted.

In testimony whereof, I have signed this specification in the presence of two subscribing witnesses.

HARRY B. PALMER.

Witnesses:
R. W. GREEN,
JOHN M. CAHALEY.